United States Patent [19]

Hanke et al.

[11] Patent Number: 5,466,281
[45] Date of Patent: Nov. 14, 1995

[54] WATER-BASED INK COMPOSITION FOR BALL-POINT PEN

[75] Inventors: David E. Hanke, Escondido; Bruce Gindelberger, San Diego; Saul Heiman, La Jolla, all of Calif.

[73] Assignee: National Ink Incorporated, El Cajon, Calif.

[21] Appl. No.: 273,338

[22] Filed: Jul. 11, 1994

[51] Int. Cl.$^6$ .......................... C09D 11/02; C09D 11/10; C09D 11/14
[52] U.S. Cl. .................. 106/20 R; 106/22 F; 106/24 R; 106/25 R; 523/161; 524/54
[58] Field of Search ................................. 106/20 R, 25 R, 106/24 R, 22 F, 22 H; 523/161; 521/54

[56] References Cited

U.S. PATENT DOCUMENTS

| | | | |
|---|---|---|---|
| 3,425,779 | 2/1969 | Fisher et al. | 401/190 |
| 4,308,061 | 12/1981 | Iwahashi et al. | 106/22 H |
| 4,460,727 | 7/1984 | Shoji | 524/215 |
| 4,471,079 | 9/1984 | Enami | 523/161 |
| 4,545,818 | 10/1985 | Inoue et al. | 106/25 R |
| 4,671,691 | 6/1987 | Case et al. | 106/20 R |
| 4,686,246 | 8/1987 | Gajria | 523/161 |
| 4,726,845 | 2/1988 | Thompson et al. | 106/25 R |
| 4,786,198 | 11/1988 | Zgambo | 106/20 R |
| 4,789,399 | 12/1988 | Williams et al. | 106/25 R |
| 4,942,185 | 7/1990 | Inoue et al. | 521/54 |
| 4,971,628 | 11/1990 | Loftin | 106/22 F |
| 5,013,361 | 5/1991 | Case et al. | 106/22 F |
| 5,048,992 | 9/1991 | Loftin | 401/209 |
| 5,062,890 | 11/1991 | Miyashita et al. | 106/27 R |

FOREIGN PATENT DOCUMENTS 1139038   1/1967   United Kingdom .

OTHER PUBLICATIONS

Kelzan *T Clarified Xanthan Gum—For Industrial Water–based Products Merck & Co., Kelco Division USA, 1991. (No Month available).

*Primary Examiner*—Helene Klemanski
*Attorney, Agent, or Firm*—Fish & Richardson

[57] ABSTRACT

A shear-thinning ink composition for use in ball point pens contains a substantially reduced amount of water. These low water-containing inks contain a polymeric material and exhibit superior "cap off" properties by remaining free-flowing after the cap has been off of the pen for at least seven days. The ink compositions of this invention comprise as little as 4 parts by weight of water if the ink utilizes dye as the colorant and as little as 10 parts by weight of water, based on 100 parts of the total composition, if the ink utilizes pigment as the colorant.

19 Claims, No Drawings

WATER-BASED INK COMPOSITION FOR BALL-POINT PEN

BACKGROUND OF THE INVENTION

1. Field of the Invention

The present invention relates to writing fluids for writing with a pen, and more particularly to aqueous-based ink for writing with ball point pens.

2. Description of Related Art

Aqueous ink compositions for ball-point pens must retain writability for a prolonged period of time with the cap removed from the pen as well as possess flow characteristics suitable for smooth writing with a line of uniform width corresponding to the ball diameter at the tip of the pen. In addition, the ink must flow to the tip of the pen without interruption when used for rapid writing without accumulating any residue of ink components at the tip of the pen.

Inks characterized as "paste" ink by virtue of high viscosity, normally in excess of 8,000 centipoise (cps), are utilized with a pen having a tube closed at one end by the ball, point assembly or a larger diameter tube, similarly closed at the point and with a viscous "follower" in intimate contact with the ink at the back of the tube to prevent back leaking and evaporation of the ink. The flow o characteristics, of paste ink in a ball point pen are dependent upon the viscosity of the ink and on the clearances between the ball and its housing.

Ball pens utilizing paste inks have at least two serious drawbacks. The high viscosity of the ink causes the pen to drag on the paper during writing, and the user must, therefore, press harder to generate a written line. Also,, the viscous ink tends to produce blots on the paper that smudge, or, to avoid smudging, the rate at which ink is metered onto the paper must be set so low that the intensity of the written line is too light.

To overcome these problems, a "fluid" ink can be used, one having a viscosity in the range of 1.0 to 10.0 cps. In a ball point pen utilizing fluid ink, the low viscosity of the ink provides free-flowing ink for writing at low pen-to-paper pressures and produces, in addition, a high intensity line. However, there are certain disadvantages inherent in the fluid-ink pen. First, the low viscosity ink does not provide adequate lubrication for the ball of the pen. Consequently, the pen is not smooth-writing, and the ball wears rapidly due to lack of lubrication. Secondly, the reservoir in the fluid ink ball pen must be vented directly to the atmosphere to prevent formation of a flow-inhibiting vacuum within the pen as ink flows from it or leakage when the pressure inside the pen increases due to changes in temperature. Fluid inks are generally water-based and are inherently subject to evaporation. In addition, fluid inks are prone to "feathering" due to absorption of the ink into the fibers of the paper by capillary action, giving a ragged look to the line.

Due to these problems, ball point pens utilizing fluid ink must employ a costly ink-flow control system that incorporates a capillary reservoir or a vacuum reservoir as taught in U.S. Pat. No. 3,951,555. In a capillary reservoir system, the ink reservoir includes a fibrous absorber, similar in design to a cigarette filter, which retains the ink within the reservoir by capillary attraction, supplying a flow of ink to the rotating ball through a feeder wick at a rate just sufficient to result in the formation of a continuous line during use, but insufficient to provide an excess supply of liquid ink at the writing tip. The feeder wick may employ porous rods in the form of sintered fibrous bundles or extruded plastic ink rods having capillary channels and intended to control the rate of ink feed to the rotating ball. The reservoir, a bundle of fibers, is connected to a feeder rod with the fiber bundle acting as a reservoir to hold ink inside the pen, and with the other end of the rod in close proximity to the tip of the pen. Inks containing pigments rater than soluble dyes tend to clog the capillary passages in fibrous reservoirs and feed rods. Examples of prior art patents exemplifying such systems include U.S. Pat. Nos. 4,145,148 and 4,726,845.

Another disadvantage of the design utilizing a fiber reservoir and feeder rod is that up to 50% of the ink may be retained by the fibrous reservoir and never be available for writing because it is retained in the smaller capillary channels between the fibers. U.S. Pat. No. 4,671,691 reports that the problems associated with the fibrous reservoir and feeder rod assembly cannot be corrected by simply thickening the ink and eliminating the assembly. Ink flow at the tip of the pen can be lost due to evaporation or mechanical shocks, that create a separation of ink from the point of the pen.

An alternative Solution to the problems associated with elimination of the fibrous reservoir and feeder rod is provided by ink containing a polar solvent that is at least 50% by weight of water and is thickened by a water-dispersible gum or resin. For instance, Great Britain Patent No. 2,131, 040A teaches that an ink with at least 32.74% water, 0.2 to 0.45% xanthan gum as thickener, and at least 5% of a wetting agent will overcome the problems inherent with ball pens employing the fibrous reservoir and feeder rod assembly. U.S. Pat. No. 5,045,992 describes a shock resistant ink that is at least 50% water and contains a polymeric thickener with a shock resisting additive, such as polyvinyl pyrrolidone, and/or polyvinyl alcohol. U.S. Pat. No. 5,013,361 teaches that at least 49.5% water is needed when a polymeric thickener is used in ink for a ball pen.

U.S. Pat. No. 4,942,185, describes an ink for marker pens that is at least 50% water and is stabilized by a water solubilized terpolymer of $\alpha$-methylstyrene, styrene, and acrylic acid. The terpolymer is disclosed as providing the attribute of shear thinning, thereby permitting flow through the fiber tip of the marker pen.

The concept that the thickness of ink must change as the ink moves through the pen onto the surface of the ball is well known in the prior art. It is known to incorporate into the ink a polymeric material that converts the ink to a shear-thinning fluid, allowing it to act as a liquid under high shear conditions and as a paste under conditions of low shear. U.S. Pat. No. 3,425,779 teaches that the rheological properties of the ink must be designed to control flow through the tip of the ball pen and it utilizes a soluble polymer to provide a desired thickness to the ink.

For example, U.S. Pat. No. 4,726,845 provides a writing ink that displays a high shear viscosity allowing greater smoothness in writing and less wicking than typical liquid ink ball pen inks. British Patent Application No. 2,131,040 and U.S. Pat. No. 4,671,691 disclose an aqueous ink containing 0.2 to 0.45 part by weight of xanthan gum that is used in a ballpoint pen that includes a viscous follower in the ink reservoir. British Patent Application No. 2,094,820A discloses an ink composition comprising a polyelectrolyte polymer and a high polarity solvent that is used like a liquid ink in a ball pen having a sealed and pressurized ink reservoir. More recently, a "substantially waterless" writing ink thickened with xanthan gum is disclosed in U.S. Pat. No. 4,726,845. The ink has high viscosity while at rest but thins out quickly if subjected to a shearing force such as is found in the socket of a roller ball pen as the ball rotates.

Every pen design has different geometries for the ball and socket that significantly change the flow characteristics of the ink. The optimum viscosity and flowability of the ink is unique to each pen design. Thus, the best "rheometer" for testing any ink is a use test conducted with the pen that will be used by the customer.

A particularly troublesome problem associated with inks containing substantial amounts of water and other volatile liquids is known as the "cap off" problem in which a pen fails to write if it is stored without a cap around the tip. Without the cap to prevent evaporation, the ink dries, and debris of resin, pigment and other components do not flow upon application of shear stress, forming a crust around the ball and at the interface of the ball socket. This debris blocks the ink from flowing into the tip of the pen. The problem is particularly acute when the ink contains water, which evaporates quickly.

Consequently, the need exists for more and better formulations of ink for use in ball pens, particular of shear-thinning inks. Particularly, needed are formulations of shear-thinning inks containing substantially reduced water content to minimize the "cap off" problems generally associated with water-containing inks.

SUMMARY OF THE INVENTION

An ink composition for use in a ball point pen containing a substantially reduced amount of water, which ink exhibits superior "cap off" properties by remaining free-flowing after the cap has been off of the pen for at least seven days. The ink compositions of this invention comprise:

a) 69 to 92 parts by weight of a polar non-aqueous liquid in 100 parts by weight of the total composition in 100 parts by weight of the total composition;

b) 4 to 25 parts by weight of water in 100 parts by weight of the total composition;

c) sufficient of a shear-thinning polymeric material to provide a shear-thinning fluid; and d) 2 to 10 parts by weight of a dye and/or 12 to 35 parts by weight of a pigment dispersion based on 100 parts by weight of the total composition.

DETAILED DESCRIPTION OF THE INVENTION

The ink compositions employed in the practice of this invention are shear-thinning fluids containing high levels of polar non-aqueous high boiling liquids. Thixotropic or "shear-thinning" fluids possess a viscosity which decreases as a function of time as well as of shear rate. As the viscosity breaks down with constant shear rate, shear stress decreases. As the shear rate is increased, a point is reached at which the shear stress will suddenly and substantially decrease until a minimum shear stress is reached beyond which no further reduction in viscosity can occur for that shear rate. Upon removal of shear, the fluid returns to its original viscosity.

Common examples of thixotropic or shear-thinning fluids are mayonnaise, drilling muds, paints and inks. Thus, the ink compositions of this invention are characterized by having rheological properties that make them highly shear-thinning in use in a ball pen writing instrument.

The present ink compositions differ from those of the prior art by elimination of most of the water so that very long cap off times are achieved with ball pens using the inks of this invention. In prior art inks, the upper limit for the content of water in shear-thinning polymeric inks ranges from 50 to 67%. By contrast, in the present invention as little as 4% by weight of water is required, although the amount of water required differs depending upon the selection of polymeric thickener used and whether the colorant is a dye or a pigment. For example 3 to 35 parts by weight of a colorant can be used. In general, ink formulations generally contain from about 18 to 22 parts by weight of water. Formulations containing dyes as the coloring agent require between about 4 and 25% by weight of water for example between about 12 and 14% while ink formulations containing pigments as the coloring agent require from about 10 to 17% by weight of water. The amount of polar non-aqueous liquids for pigment and/or dye based inks range from about 69 to 92% by weight of the ink in 100 parts of the total composition.

These low water-containing inks provide the advantage of substantially increased cap off times as compared with prior art inks. In general, when used in a ball point pen, the inks of this invention remain usable when the cap has been removed from the pen for at least 7 days, and preferably for at least 30 days.

The ink compositions of this invention are characterized by containing at least one shear-thinning gum, resin or polysaccharide. The polymeric materials from the plant family for use in this invention include guar gum, carrageenan gum, algin, xanthan gum, gum arabic, gum tragacanth, locust bean gum, psyllium seed gum, pectin, dextran, larch gum, quince seed gum, tamarind gum, and starches containing high levels of amylose. Preferred examples of shear-thinning gums, suitable for use in this invention include: xanthan gum (RHODOPOL®, from Rhone-Poulenc, Inc., Cranbury, N.J.).

Other chemically modified polymeric materials from the plant family that can be used in the practice of this invention are, for example, hydroxypropylcellulose, methyl cellulose, and hydroxyethylcellulose.

Polymeric materials from the animal family that can be used include gelatin and other proteins having thickening capabilities and that function as protective colloids to prevent formation of lumps in the bulk ink, such as those due to formation of small cells of marginally compatible ink components.

Polymeric materials that are chemical modifications to hydrocarbons such as natural gas or crude oil can also be used in the practice of this invention. Examples include α-methylstyrene/styrene/acrylic acid terpolymers such as JONCRYL 58® terpolymer from S.C. Johnson, polyacrylic acid such as CARBOPOL® 934 from B. F. Goodrich, polyethyleneoxide, such as POLYOX® polymer from Union Carbide, polyvinyl pyrrolidone from GAF and polyvinyl alcohol from Air Products Co.

The amount of polymer selected is that necessary to achieve; a viscosity suitable to obtain smooth writing with the pen for which the ink is designed, for instance about 0.1 to 0.5 part by weight of the polymeric material can be used. In general, the ball diameter in a ball point pen may vary from 0.4 mm for a very fine line to 1.4 mm for a tip used in art work.

The range of viscosities (at 25° C.) encompassed by this invention for ball diameters within this range are as follows as measured according the manufacturer's instructions by a Brookfield Viscometer, Model LVT with a No. 3 spindle:

| Spindle | RPMs | 6 | 12 | 30 | 60 |
|---------|------|---|----|----|----|
| High | Viscosity (cps) | 7480 | 4675 | 2025 | 1584 |
| Low | Viscosity (cps) | 1350 | 1080 | 720 | 540 |

The ink compositions of this invention are based upon the use of polar non-aqueous liquids in which water is only a minor component. These non-aqueous liquids include the following: (1) mono, di, tri, and higher alcohols (2) glycol ethers, (3) glycol ether acetates, and (4) glycol acetates. For a dye based ink the amount of polar non-aqueous liquid required is in the range from 70 to 92% generally, from 70 to 75% by weight, and, preferably about 72 to 73% by weight of the ink. For a pigment-based ink the amount of polar non-aqueous liquid required is in the range from 69 to 92%, preferably about 72 to 73% by weight of the ink.

Non-limiting examples of alcohols suitable for use in this invention are hexylene glycol, octylene glycol, 1,4 butanediol, thiodiglycol, 2,3-butylene glycol, triethylene glycol, diethylene glycol, ethylene glycol, propylene glycol, glycerine, 3-methyl pentane-2,3,5-triol, trimethylolethane, trimethylolpropane, diglycerin, isopropyl alcohol, and sorbitol.

Non-limiting examples of glycol ethers suitable for use in this invention are ethylene glycol mononethylether, ethylene glycol monobutylether, diethylene glycolmonoisopropylether, propyleneglycolmonomethylether, diethyleneglycol monomethylether, propylene glycol phenylether, ethylene glycol diethyl ether, and propylene glycol phenyl ether.

Non-limiting examples of glycol ether acetates suitable for use in this invention are propylene glycol mononethylether acetate, ethylene glycol monomethylether acetate, ethylene glycol monophenylether acetate, diethylene glycol monomethylether acetate, diethylene glycol monoethylether acetate, diethylene glycol monobutylether acetate, diethylene glycol monophenylether acetate, diethylene glycol monoisopropylether acetate, ethylene glycol diethylether acetate, diethylene glycol dimethylether acetate, and propylene glycol monomethyl ether acetate.

Non-limiting examples of glycol acetates suitable for use in this invention are ethylene glycol monoacetate, ethylene glycol diacetate, and diethylene glycol diacetate.

The colorants to be used in the inks of this invention can be any of the water-soluble or dispersible dyes or pigments or mixtures thereof known to be useful in writing inks. From about 2 to 10% for example from 3 to 10%, and, preferably from about 4 to 6% by weight of a dye and/or from about 12 to 35%, preferably from about 18 to 22%, of a pigment dispersion is added to the ink formulation to obtain the desired color. Examples of dyes or pigments that can be used include, but are not limited to, Direct Violet 99, Basonyl® Blue 636, Direct Blue 86, Regal 330R Carbon Black, Fast Light Orange 2GM, titanium dioxide, Carmine 6B, Pigment Red 112, Pigment Blue 15, Pigment Green 7, Direct Blue 71, Direct Black 19, Acid Red 92, Hostafine® brand of pigments from Hoechst (Germany), Titicaca® and Victoria® brand of pigments from Mikuni (Japan), Sunsperse® and Flexiverse® brand pigments from Sun Chemical (U.S.A.), and the Luconyl® brand of pigments from BASF (Germany).

Sequestrants may be required for stabilizing some of the water dispersible xanthan, carboxymethylcellulose, and alginate-based polymeric thickeners. A sequestrant binds multivalent cations in the solution, enhancing solubility of the polymer. Suitable agents for this purpose are sodium salts of EDTA such as tetrasodium EDTA or Versene 100® of Dow Chemical, trisodium phosphate, sodium hexametaphosphate, or sodium glucoheptanate. These; sequestrants are normally added in the amount of 1–5 parts by weight of the; water-soluble gum.

Many of the preferred ink components are subject to degradation by microorganisms such as bacteria, yeast, and mold. Such degradation is prevented by the addition of a biocide such as methyl p-hydroxybenzoate, propyl p-hydroxybenzoate, 1-(3-chloroallyl)-3,5,7-triazo-1-azoniaadamantane chloride, or Proxel GXL brand of biocide, which contains 1,2-benzizothiazolin-3-one. Generally from 0.10 to 0.20%, preferably about 0.10% of a bactericide containing 60% water is added to the ink formulation to control the growth of microorganisms.

These inks containing water and polar non-aqueous liquids such as glycol can be very corrosive to metals used in the roller ball and socket of pens. This corrosivity can be controlled or eliminated by the addition of a corrosion inhibitor, for example benzotriazole, tolyltriazole, dicyclohexyl ammonium nitrate, and organic phosphate esters such as Antara LB-400® available from GAF. Generally from about 0.10 to 1.00%, preferably from 0.13 to 0.20% by weight of a corrosion inhibitor is added to the ink formulation to prevent corrosion of the tip by the ink.

It is crucial to this invention that the ink be capable of wetting the metal used in the tip of the pen to assure an acceptable delivery rate of ink to the writing surface. Suitable wetting agents for use in this invention may be chosen from, but are not limited to, surfactants such as sodium lauryl sulfate, fluorinated alkyl esters, such as Flourad FC-430 from Minnesota Mining and Mfg., St. Paul, Minn., ethoxylated trimethyl nonanol, the Tergitol® and Triton brands from Union Carbide, such as Triton X-100®, the Surfynol® brand from Air Products, the Igepal® brand from GAF, Darvan® WAQ, NS, and SMO from R. T. Vanderbilt, Dresinate® 731 rosin soap from Hercules Powder Company, Wilmington, Del. One skilled in the art will appreciate that selection of the appropriate wetting agent should be based upon actual writing tests in the type of pen having the type of writing tip in which the ink is to be used. In general, however, in a dye or pigment based ink the amount of wetting agent is from about 0.10 to 1.0%, preferably 0.14 to 0.16% by weight.

The pH of the finished ink is preferably higher than 5.0, and generally ammonia or an amine such as triethanolamine, morpholine, diethanolamine, ethylamine, or monoethylamine is added to the formulation to obtain the desired pH value. Generally, in a dye or pigment-based ink the amount of pH control agent added is from about 0.05 to 0.50%, preferably from about 0.09 to 0.11% by weight.

Table 1 below shows the percent ranges of ink components based upon total weight of the ink.

TABLE 1

| | | | PERCENT RANGES OF INK COMPONENTS BASED UPON TOTAL WEIGHT OF INK | | | | | |
|---|---|---|---|---|---|---|---|---|
| TYPE | DYE | PIG-MENT | CORROSION INHIBITOR (50% H$_2$O) | BACTERICIDE (60% H$_2$O) | SURFACTANT | pH CONTROL (80% H$_2$O) | H$_2$O | NON-AQUEOUS POLAR LIQUID |
| DYE BASED NOMINAL- | 5 | — | .15 | .10 | .15 | .10 | 20 | 73 |
| RANGE LOW/HI | 2/10 | — | .10–1.00 | .10–.20 | .10–1.0 | .05–.50 | 4–25 | 70–92 |
| PIGMENT BASED NOMINAL | — | 20[1] | .15 | .10 | .15 | .10 | 16 | 72 |
| RANGE LOW/HI | — | 12/35 | .10–1.00 | .10–.20 | .10–1.0 | .05–50 | .10–17 | 69–92 |

[1]Pigment dispersions will nominally be about 50% water

The inks of this invention contain substantially reduced amounts of water to provide superior cap off properties. Standard testing procedures have been developed for testing the cap off properties of any ink formulation in a ball point pen. A pen is qualified for testing of cap off properties only if it has performed satisfactorily in a 50 meter writing test on a write testing machine.

1) Prior to writing, the pen is weighed to within 0.0001 grams;
2) The pen is loaded to 100 grams of vertical force;
3) The pen is positioned during writing at an angle of 70° with the tip pointing in the direction of paper travel;
4) The pen writes a line 50 meters in length with the writing machine;
5) The pen is again weighed to within 0.0001 gram at completion of the test to determine the exact amount of ink used.

Fifteen pens of each variety to be tested are qualified using this procedure. Qualified pens are uncapped, placed horizontally in groups of three pens of each variant to be tested, and are stored at the test conditions of 72°±5° F. and 50% relative humidity for the following time intervals: 1 day; 7 days; 14 days; 21 days; and 28 days. The "cap off time" achieved for each pen is the interval of days that a pen has been stored without a cap on its tip before it fails to write during the first 4 cm of paper travel when reinserted into the writing machine.

The following examples illustrate the manner in which the invention can be practiced. It is understood, however, that the examples are for tile purpose of illustration and the invention is not to be regarded as limited to any of the specific materials or conditions therein.

EXAMPLE 1

| COMPONENTS | WEIGHT % |
|---|---|
| Xanthan gum (Rhone-Poulenc) | 0.20 |
| Ethylene glycol | 74.12 |
| Proxel GXL (ICI Americas Inc.) | 0.15 |
| Sunsperse black LHD-9303* (Sun Chemicals) | 20.00 |
| Cobratec TT-25-EG (PMC Specialties) | 0.25 |
| Joncryl 58 (S.C. Johnson Company) | 5.00 |
| Surfynol 104E (Air Products Company) | 0.18 |
| Ammonia as 20% NH$_3$ | 0.10 |

*48% solids, 52% aqueous medium

The total water contained in this formulation is about 14.7% by weight.

EXAMPLE 2

| COMPONENTS | WEIGHT % |
|---|---|
| Xanthan gum | 0.32 |
| Ethylene glycol | 73.95 |
| Proxel GXL | 0.15 |
| Pontamine Brilliant Violet BRW* (Miles, Inc.) | 10.00 |
| Pontamine Bond Blue A** | 10.00 |
| Cobratec TT-25-EG | 0.25 |
| Water | 5.00 |
| Surfynol 104E | 0.18 |
| Ammonia as 20% NH$_3$ | 0.10 |

*35% solids, 65% aqueous medium
**20% solids, 80% aqueous medium

The total water Contained in this formulation is about 19.6% by weight.

EXAMPLE 3

| COMPONENTS | WEIGHT % |
|---|---|
| Xanthan gum | 0.30 |
| Ethylene glycol | 78.97 |
| Proxel GXL | 0.15 |
| Titicaca Black F-10* (Mikuni Color Works) | 20.00 |
| Cobratec TT-25-EG | 0.25 |
| Surfynol 104E | 0.18 |
| Ammonia as 20% NH$_3$ | 0.15 |

*19% solids, 81% aqueous medium

The total water contained in this formulation is about 16.4% by weight.

EXAMPLE 4

| COMPONENTS | WEIGHT % |
|---|---|
| Xanthan gum | 0.26 |
| Ethylene glycol | 70.51 |
| Proxel GXL | 0.10 |
| BASACID Black X-34 Liquid Dye* (BASF) | 15.00 |
| Cobratec TT-25-EG | 0.25 |
| Propylene glycol | 10.00 |
| Water | 3.50 |
| Surfynol 104E | 0.18 |
| Ammonia as 20% NH$_3$ | 0.20 |

-continued

| COMPONENTS | WEIGHT % |
|---|---|
| *70% aqueous medium | |

The total water contained in this formulation is about 14.2% by weight.

EXAMPLE 5

| COMPONENTS | WEIGHT % |
|---|---|
| Xanthan gum | 0.18 |
| Ethylene glycol | 67.33 |
| Proxel GXL | 0.12 |
| Flexiverse black LFD-4343* (Sun Chemical) | 22.00 |
| Cobratec TT-25-EG | 0.25 |
| Glycerine | 9.74 |
| Surfynol 104E | 0.18 |
| Ammonia as 20% NH$_3$ | 0.20 |

*48.5% solids, 51.5% aqueous medium

The total water contained in this formulation is about 11.5% by weight.

EXAMPLE 6

| COMPONENTS | WEIGHT % |
|---|---|
| Xanthan gum | 0.32 |
| Ethylene glycol | 64.43 |
| Proxel GXL | 0.10 |
| Victoria Pink G-17* (Mikuni Color Works) | 30.00 |
| Cobratec TT-25-EG | .25 |
| Glycerine | 4.62 |
| Surfynol 104E | 0.18 |
| Ammonia as 20% NH$_3$ | 0.10 |

*44% solids, 56% aqueous medium

The total water contained in this formulation is about 17.0% by weight.

EXAMPLE 7

| COMPONENTS | WEIGHT % |
|---|---|
| Xanthan gum | 0.20 |
| Ethylene glycol | 65.00 |
| Proxel GXL | 0.10 |
| Sunsperse Phthalo Green, B.S.* | 20.00 |
| Cobratec TT-25-EG | 0.25 |
| Joncryl 58 | 4.45 |
| Diethylene glycol | 4.72 |
| Propylene glycol | 5.00 |
| Surfynol 104E | 0.18 |
| Ammonia as 20% NH$_3$ | 0.10 |

*46% solids, 54% aqueous medium

The total water contained in this formulation is about 13.2% by weight.

EXAMPLE 8

| COMPONENTS | WEIGHT % |
|---|---|
| Xanthan gum | 0.34 |
| Ethylene glycol | 70.03 |
| Proxel GXL | 0.10 |
| Titicaca Blue F-21* | 27.00 |
| Joncryl 58 | 2.00 |
| Cobratec TT-25-EG | 0.25 |
| Surfynol 104E | 0.18 |
| Ammonia as 20% NH$_3$ | 0.10 |

*25% solids, 75% aqueous medium

The total water contained in this formulation is about 21.3% by weight.

EXAMPLE 9

| COMPONENTS | WEIGHT % |
|---|---|
| Xanthan gum | 0.30 |
| Ethylene glycol | 68.14 |
| Proxel GXL | 0.10 |
| Hostafine Black T* (Hoechst) | 18.00 |
| Carbowax 400 | 2.50 |
| Joncryl 58 | 2.00 |
| Propylene glycol | 2.80 |
| Glycerine | 5.63 |
| Cobratec TT-25-EG | .25 |
| Surfynol 104E | .18 |
| Ammonia as 20% NH$_3$ | .10 |

*40% solids, 60% aqueous medium

The total water contained in this formulation is about 11.9% by weight.

EXAMPLE 10

| COMPONENTS | WEIGHT % |
|---|---|
| Xanthan gum | 0.32 |
| Ethylene glycol | 69.00 |
| Proxel GXL | 0.12 |
| FL Pink 21* (Fuji) | 27.04 |
| Carbowax 400 | 1.85 |
| Joncryl 58 | 1.10 |
| Cobratec TT-25-EG | 0.29 |
| Surfynol 104E | 0.18 |
| Ammonia as 20% NH$_3$ | 0.10 |

*47% solids, 53% aqueous medium

The total water contained in this formulation is about 14.9% by weight.

EXAMPLE 11

| COMPONENTS | WEIGHT % |
|---|---|
| Xanthan gum | 0.32 |
| Ethylene glycol | 70.00 |
| Proxel GXL | 0.10 |
| FC-430 (Minnesota Mining & Manufacturing) | 0.15 |
| Victoria Green G-24* | 24.50 |
| Cobratec TT-25-EG | 0.25 |
| Joncryl 58 | 4.38 |
| Surfynol 104E | 0.15 |

-continued

| COMPONENTS | WEIGHT % |
|---|---|
| Ammonia as 20% NH$_3$ | 0.15 |

*45% solids, 55% aqueous medium

The total water contained in this formulation is about 15.7% by weight.

EXAMPLE 12

| COMPONENTS | WEIGHT % |
|---|---|
| Xanthan gum | 0.35 |
| Ethylene glycol | 70.52 |
| Proxel GXL | 0.10 |
| Orient Water Red 1 (Orient Chemical) | 4.00 |
| Acid Red 92 | 2.00 |
| Water | 20.50 |
| Cobratec TT-25-EG | 0.25 |
| Carbowax 400 | 2.00 |
| Tergitol MNW-6 (Union Carbide) | 0.18 |
| Ammonia as 20% NH$_3$ | 0.10 |

The total water contained in this formulation is about 20.8% by weight.

EXAMPLE 13

| COMPONENTS | WEIGHT % |
|---|---|
| Xanthan gum | 0.35 |
| Ethylene glycol | 70.56 |
| Proxel GXL | 0.15 |
| Special Brilliant Blue FFR (Miles Inc.) | 5.00 |
| Water | 21.36 |
| Cobratec TT-25-EG | 0.25 |
| Carbowax 400 | 2.00 |
| Tergitol MNW-6 | 0.18 |
| Ammonia as 20% NH$_3$ | 0.15 |

The total water contained in this formulation is about 21.7% by weight.

EXAMPLE 14

| COMPONENTS | WEIGHT % |
|---|---|
| Xanthan gum | 0.20 |
| Ethylene glycol | 72.62 |
| Proxel GXL | 0.15 |
| Flexiverse Blue BFD-3229* | 21.00 |
| Special Brilliant Blue FFR | 1.00 |
| Cobratec TT-25-EG | 0.25 |
| Water | 4.45 |
| Surfynol 104E | 0.18 |
| Ammonia as 20% NH$_3$ | 0.15 |

*47% solids, 53% aqueous medium

The total water contained in this formulation is about 15.7% by weight.

EXAMPLE 15

| COMPONENTS | WEIGHT % |
|---|---|
| Xanthan gum | 0.31 |
| Ethylene glycol | 71.83 |
| Proxel GXL | 0.19 |
| Levanyl Black A-SF* (Miles, Inc.) | 25.00 |
| Cobratec TT-25-EG | 0.34 |
| Surfynol 104E | 0.18 |
| Ammonia as 20% NH$_3$ | 0.15 |
| Carbowax 400 | 2.00 |

*43% solids, 57% aqueous medium

The total water contained in this formulation is about 14.5% by weight.

EXAMPLE 16

| COMPONENTS | WEIGHT % |
|---|---|
| Xanthan gum | 0.40 |
| Ethylene glycol | 70.00 |
| Proxel GXL | 0.15 |
| Luconyl Red 3870* (BASF) | 24.88 |
| Joncryl 58 | 2.00 |
| Diethylene glycol monophenylether | 2.00 |
| Cobratec TT-25-EG | 0.25 |
| Surfynol 104E | 0.18 |
| Ammonia as 20% NH$_3$ | 0.14 |

*33% solids, 67% aqueous medium

The total water contained in this formulation is about 14.3% by weight.

EXAMPLE 17

| COMPONENTS | WEIGHT % |
|---|---|
| Xanthan gum | 0.36 |
| Ethylene glycol | 90.15 |
| Acid Violet 19 | 4.08 |
| Surfynol 104E | 0.17 |
| Cobratec TT-25-EG | 0.25 |
| Proxel GXL | 0.16 |
| Triethanolamine | 0.23 |
| Water | 4.46 |
| FC-430 | 0.14 |

The total water contained in this formulation is about 4.49% by weight.

The foregoing description of the invention is exemplary for purposes of illustration and explanation. It should be understood that various modifications can be made without departing from the spirit and scope of the invention. Accordingly, the following claims are intended to be interpreted to embrace all such modifications.

We claim:

1. An ink composition comprising
   a) 69 to 92 parts by weight of a polar non-aqueous liquid based on 100 parts by weight of the total composition;
   b) 4 to 25 parts by weight of water based on 100 parts by weight of the total composition;
   c) an effective amount of a polymeric material to provide a shear-thinning fluid; and d) 3 to 35 parts by weight of a colorant based on 100 parts by weight of the total composition.

2. An ink of claim 1 further comprising 12 to 35 parts by weight of a pigment dispersion as the colorant and from about 0.10 to 0.50 parts by weight of the polymeric material, based on 100 parts of the total composition.

3. An ink of claim 2 wherein the polymeric material is derived from the plant family.

4. An ink of claim 2 wherein the polymeric material is derived from the animal family.

5. An ink of claim 2 wherein the polymeric material is a chemically modified hydrocarbon.

6. An ink of claim 2 wherein the polar non-aqueous liquid is ethylene glycol.

7. An ink of claim 2 wherein the polymeric material is xanthan gum.

8. An ink of claim 2 wherein the polymeric material is α-methylstyrene-styrene-acrylic acid terpolymer.

9. An ink of claim 2 wherein the polar non-aqueous liquid is from about 72 to 73 parts by weight and the water is from about 18 to 22 parts by weight.

10. An ink of claim 2 further comprising from about 0.10 to 1.0 parts by weight of a fluorinated hydrocarbon surfactant.

11. An ink of claim 1 wherein the amount of the polar non-aqueous liquid is from about 70 to 75 parts by weight and wherein the ink further comprises from about 3 to 10 parts by weight of a dye and about 0.10 to 0.50 parts by weight of the polymeric material, based on 100 parts by weight of the total composition.

12. An ink of claim 11 wherein the polymeric material is derived from the plant family.

13. An ink of claim 11 wherein the polymeric material is derived from the animal family.

14. An ink of claim 11 wherein the polymeric material is a chemically modified hydrocarbon.

15. An ink of claim 11 wherein the polar non-aqueous liquid is ethylene glycol.

16. An ink of claim 11 wherein the polymeric material is xanthan gum.

17. An ink of claim 11 wherein the amount of the polar non-aqueous liquid is from about 72 to 73 parts by weight, and the amount of the water is from about 12 to 14 parts by weight, based on 100 parts of the total composition.

18. An ink of claim 11 wherein the polymeric material is alpha-methylstyrene-styrene-acrylic acid terpolymer.

19. An ink of claim 11 further comprising from about 0.10 to 1.0 parts by weight of a fluorinated hydrocarbon surfactant, based on 100 parts of the total composition.

\* \* \* \* \*